United States Patent [19]

Ando et al.

[11] Patent Number: 4,910,076
[45] Date of Patent: Mar. 20, 1990

[54] FIBER REINFORCED CEMENT MORTAR PRODUCT

[75] Inventors: Tatsuo Ando, Yokohama; Takeshi Ikeda, Zama; Hiromichi Sakai, Kitakyushu; Hirobumi Otaguro, Kitakyushu; Takeo Sawanobori, Kawasaki, all of Japan

[73] Assignee: Mitsubishi Kasei Corporation, Tokyo, Japan

[21] Appl. No.: 24,720

[22] Filed: Mar. 11, 1987

[30] Foreign Application Priority Data

Mar. 11, 1986 [JP] Japan .................................. 61-052893
Oct. 29, 1986 [JP] Japan .................................. 61-257965
Oct. 29, 1986 [JP] Japan .................................. 61-257966

[51] Int. Cl.$^4$ ............................................. B32B 7/00
[52] U.S. Cl. ..................................... 428/245; 428/257; 52/600; 52/309.17
[58] Field of Search ........... 52/309.15, 309.16, 309.17, 52/600, DIG. 7; 428/245, 257

[56] References Cited

U.S. PATENT DOCUMENTS

| | | |
|---|---|---|
| 2,414,011 | 1/1947 | Billner . |
| 2,754,674 | 7/1956 | Malsbury et al. ............... 52/687 |
| 2,951,006 | 8/1960 | Rubenstein ............... 52/DIG. 7 X |
| 3,145,502 | 8/1965 | Rubenstein ............... 52/309.17 X |
| 3,177,902 | 4/1965 | Rubenstein ............... 52/DIG. 7 X |
| 3,597,890 | 8/1971 | Hala ............................ 52/86 |
| 3,852,930 | 12/1974 | Naaman ............... 52/664 |
| 3,949,144 | 4/1976 | Duff ............... 428/414 |
| 4,297,409 | 10/1981 | Hannaht ............... 428/252 X |
| 4,528,223 | 7/1985 | Kumazawa ............... 428/252 X |
| 4,620,401 | 11/1986 | L'Esperance et al. ............ 52/309.15 |
| 4,627,998 | 12/1986 | Akihoma et al. ............... 428/285 |
| 4,662,946 | 5/1987 | Mercer ............... 428/134 X |
| 4,684,567 | 8/1987 | Okamoto ............... 428/257 |
| 4,706,430 | 11/1987 | Sugita ............... 52/309.17 X |

FOREIGN PATENT DOCUMENTS

| | | | |
|---|---|---|---|
| 175834 | 1/1953 | Austria ............... | 52/600 |
| 980948 | 5/1951 | France ............... | 52/600 |
| 697665 | 11/1979 | U.S.S.R. ............... | 52/600 |
| 14602 | 7/1899 | United Kingdom ............... | 52/600 |

Primary Examiner—Carl D. Friedman
Assistant Examiner—Jerrold D. Johnson
Attorney, Agent, or Firm—Oblon, Spivak, McClelland, Maier & Neustadt

[57] ABSTRACT

Cement mortar matrix and product are formed which are reinforced with a resin-impregnated twist-woven (Karami-ori) network of fibers which are oriented in the cement mortar in the direction of the maximum tensile stress yielded by the bending moment.

5 Claims, 3 Drawing Sheets

FIBER REINFORCED CEMENT MORTAR PRODUCT

BACKGROUND OF THE INVENTION

1. Field of the Invention

The present invention relates to a fiber reinforced cement mortar product made of the network of long fiber oriented and laid in the cement mortar matrix.

2. Discussion of the Background

Fibers reinforced cement mortar is widely employed, generally in form of sheet, tube, hollow plank, block, etc.

The typical example of the fiber reinforced cement mortar has been so called asbestos cement board, but recently, in view of preventing environmental pollution by asbestos, various organic and inorganic fiber have increasingly been tried as replacement.

However, most of them are made by the process of dispersing short fiber randomly to two or three dimensions in the cement mortar. So a large quantity of fiber is necessary to obtain highly strong and elastic material which usually results in making a lot of waste.

Especially, the greatest drawback, when high-tech fiber is used, is that strength and elasticity of the fiber can't be brought out and that the product is costly.

So such a process has been proposed as molding long fiber previously formed into linear strands or lattice-work and orienting them proponderantly in one or two dimension in the cement mortar matrix section, and improving properties of mortar.

The merit of this method is that the amount of fibers is saved to procure the same flexural or tensile strength as that of the fiber-reinforced cement where fibers are randomly oriented either in two or three dimensions. Moreover, material design is possible, and the higher the properties of the fiber, the more effectively the excellent performance of fiber can be drawn.

But former method of reinforcing by long fibers has been drawbacks that the bond between cement mortar matrix and reinforcing fiber, or between fibers aren't enough to bring sufficient strength.

On the other hand, fiber strands or rods by resin-impregnation high strength as fiber reinforced resin product is expected, but the bond between cement mortar and resin is not sufficient in itself, making the rods slip, so rods can be pulled out.

Besides, autoclaving for improving the dimensional stability of mortar causes deterioration of resin by the high temperature and alkaline environment, resulting in decline of the flexural strength of the product.

On the other hand, bond between cement mortar matrix and the fiber can be improved by roughening the surface of the fiber, or making them into fibril. However the stronger the fiber the more it fails abruptly on reaching the maximum stress, and it is disadvantageous that the reinforced material is poor in toughness.

To improve toughness of the product, more ductile fiber is employed, bond between fibers and cement mortar matrix is adjusted, and compressive failure of cement mortar matrix is induced. However, they are disadvantageous because of the difficulty of section design of the product and the lack of the quality stability.

SUMMARY OF THE INVENTION

The inventors have conductive extensive research to solve the above difficulties, and have found that such drawbacks can be overcome by using a previously twist-woven (so called Karmai-ori) network, covering it with a specific coating, and laying this so as to orient the twisted fiber strand of this network in the direction of tensile stress yielded by the bending moment.

That is, the object of the present invention is to offer a fiber reinforced cement mortar excellent in stress transmission, strength, toughness and shock-resistance, and also capable of undergoing autoclaving.

The above object can be readily attained by the fiber reinforced mortar reinforced with the fiber network consisting of twist-woven strands impregnated with resin, and in which the twisted strands are laid in the direction of the maximum tensile stress yielded by the bending moment.

It also can be attained by the fiber reinforced cement mortar reinforced with the fiber network consisting of twist-woven strands impregnated with synthetic resin and coated with reactive co-polymer latex, in which the twist-woven strands of the network is laid in the cement mortar and oriented in the direction of maximum tensile stress yielded by the bending moment.

BRIEF DESCRIPTION OF THE DRAWINGS

Now, the present invention will be described in detail.

Of the accompanying drawings.

DESCRIPTION OF THE PREFERRED EMBODIMENTS

The composition and type of longitudinal and lateral fiber strands is selected arbitrarily.

The dimension of the opening is arbitrary as long as it does not obstruct the continuity of the cement mortar matrix. It is usually equal not more than 10 openings/inch (equal or greater than 2.5 mm@), preferably 5 openings/inch(5 mm@)~2 openings/inch(12.7 mm@).

There is no particular restriction for the cement mortar in the present invention, so long as it is hydraulic cement, such as Portland cement, rapid-hardening Portland cement, etc.

Organic or inorganic, reinforcing fiber, can be used, especially fibers with equal or more than 150 kgf/mm$^2$ of monofilament tensile strength and alkali-resistance, such as carbon fiber, alkali-resistant glass fiber, aramid fiber, high strength vinylon fiber, etc. are preferable.

In the present invention, a network made of reinforcing fiber is used.

In the present invention, the network is primarily impregnated with resin, in a conventional method, for example in the resin bath, or impregnation by a roller.

After resin impregnation, it is preferable to suspend and dry the network.

It is preferable to impregnate the twist-woven network with a non-watersoluble resin. It is preferable to use a resin which has good impregnation into the network, ease of operation, low viscosity and is able to harden at room temperature. It is also preferable that the resin doesn't provoke deterioration in the alkaline environment of the cement mortar.

Epoxy resin, urethane resin, phenol resin etc. are preferable. The network is impregnated with these resins and dried. The resins should be partially hardened, since it is preferable to insure flexibility, better bonding with the reactive co-polymer latex and ease of handling.

When flexibility is demanded, an SBR latex can be employed.

Semi-hardened epoxy resin, the softening temperature of which is more than 40° C., may also be used.

Figure 1:
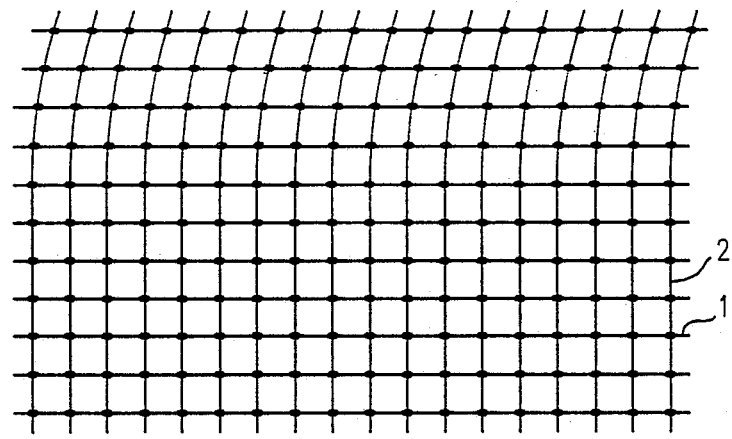
FIG. 1 shows an example of the product in which 1 is twist-woven fiber strands, and 2 is lateral fiber strands. In this example the number of fiber stands 1 is twice the number of fiber strands 2, because only one kind of fiber strand is employed. However, the number of longitudinal and lateral fiber strands can be readily determined according to the design condition of the product.
Figure 2:
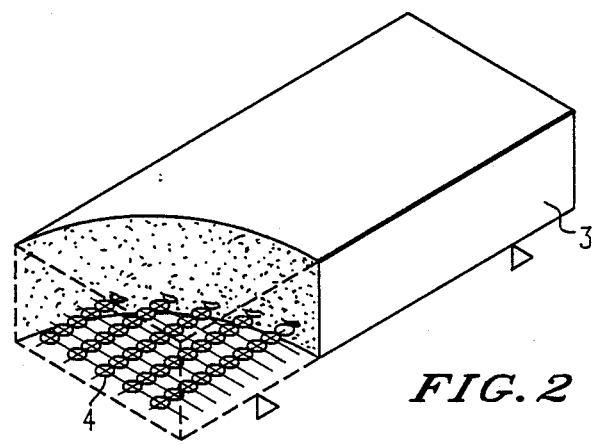
FIG. 2 shows the overall view of the product in which the twist-woven strands is oriented in the longitudinal direction of the specimen, in which 3 is cement mortar, and 4 is a twist-woven strand network.
Figure 3:
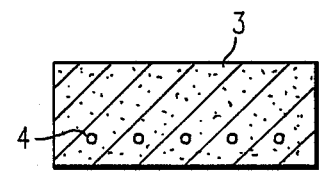
FIG. 3 shows the cross-section of the motar plank laid with twist-woven network.
Figure 4:
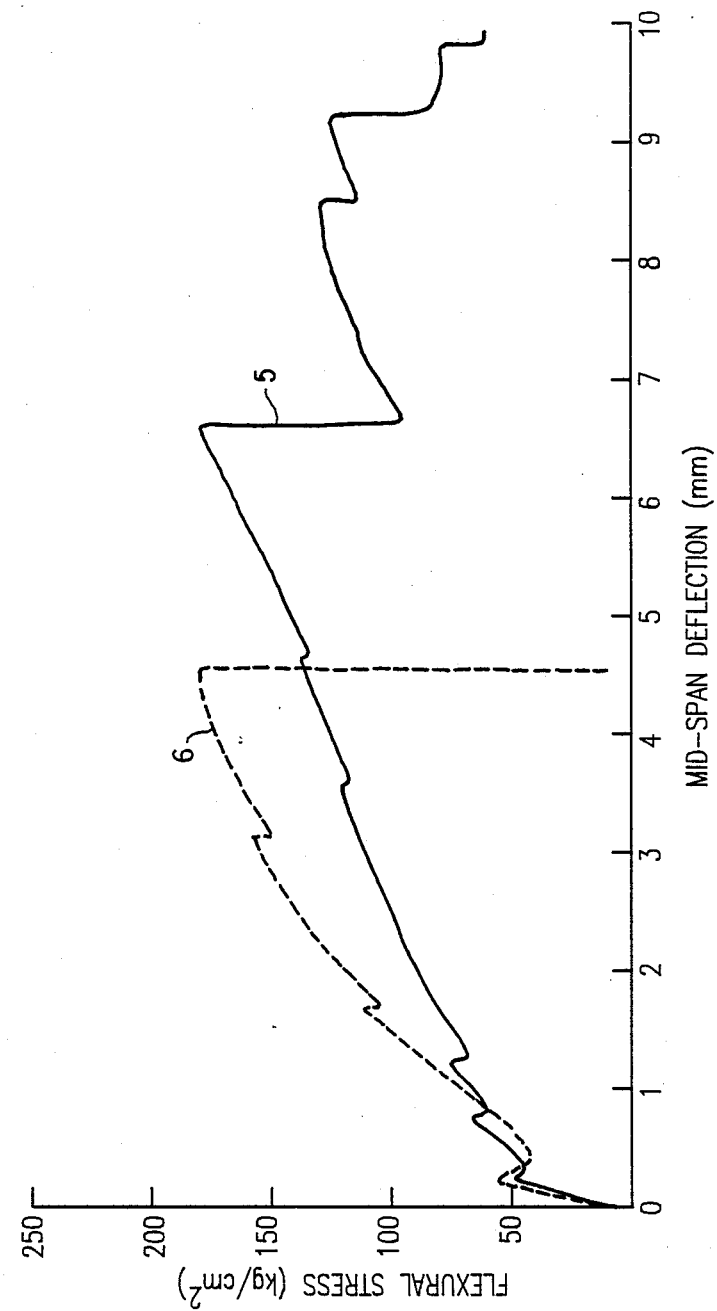

After impregnating the resin into the twist-woven network and drying, the network is laid in the cement mortar, so that the twist-woven strands are oriented in the direction of the maximum tensile stress yielded by the bending moment. Namely, twist-woven fibers 1 are oriented in the longitudinal direction of the cement mortar specimen 3, which is the direction of the maximum tensile stress yielded by the bending moment, as in the FIGS. 2 and 3.

In this case, only 1 layer of network is laid in the lower side of the mortar specimen 3, but in compliance with the section design, more than two layers may be laminated, and the upper side of the specimen may also be reinforced with the network.

At this time, resin is not necessarily hardened, but it is preferable to be hardened in view of the ease of operation and laying, and damage prevention of the fiber during the treatment.

For the better bond with the matrix, after resin-impregnation and hardening, fine sand etc. may be adhered again to the surface of the network to give anchoring effect to the matrix.

Reactive co-polymer latex used in the second treatment of this invention are classified into two different categories: the first type is a self-bridging type polymer that form into a three dimensional network by itself when heat-treated. The second type being the bridging polymer reactive only with metal-oxide, urea resin, melamine resin, or urethane resin, etc. It's preferable to use a self bridging copolymer.

Main monomers of the above-described self-bridging polymer can be: butadiene, butadiene/styrene, butadiene/acrylonitrile, butadiene/methylmethacrylate, isoprene, chloroprene, styrene derivatives, vinyl acetate derivatives, acrylate derivatives, methacrylate derivatives, vinyl chloride derivatives, vinylidene chloride family, ethylene family, ethylene/vinyl acrylate derivatives, vinylacetate acrylate, acrylate/styrene, etc. with these monomers, self bridging polymer is obtained by the ordinary emulsified polymerization, adding and co-polymerizing more than two monomers with reactive functional group.

Monomer having reactive functional group can be:

(1): Glycidyl acrylate, glycidyl methacrylate, or allyl glycidyl ether, having epoxide group, (2): dimethylaminoethyl methacrylate, vinyl pyridine, or t-butylaminoethyl methacrylate, having amino group, (3): acrylic acid, methylacrylic acid, crotonic acid, itaconic acid, maleic acid, or fumaric acid, having carboxyl group, (4): allyl alcohol, 2-hydroxyethylmethacrylate, 2-hydroxypropylacrylate, having hydroxyl group, (5): acrylic amide, methacrylic amid, maleic amide, having amid group, (6): N-methylol acrylic amid, N-methylol methacrylic amid or ethers thereof, having N-methylol group, (7): vinyl isocyanate, allyl isocyanate, having isocyanate group, in which it is preferable to take (3) and functional group bridging with (3), for example at least one of (1), (4), (6) or (7), and to co-polymer them with main monomers above cited.

The addition of the monomer containing reactive functional group is 0.2~20 wt%(preferably 0.2~15 wt%) of the principal monomer.

After resin impregnation, coating with above-described reactive copolymer latex is applied to the network in the same way as resin impregnation.

After coating, the above-mentioned latex is dried and hardened(bridge formation) by the heat treatment, at the temperature of 100°~250° C.(preferably 105°~180° C.)for 1~30 min.

After the reactive copolymer hardened, the twist-woven strands are oriented in the cement mortar, in the direction of the maximum tensile stress yielded by the bending moment.

Meanwhile, the tensile strength of the resin-impregnated, simply twisted double strands(FRP rod) which were treated with latex and sampled without being laminated with cement mortar was determined.

The strength itself is a little higher than the single strand treated in the same way.

This suggests that little reinforcing effect is expected.

However, on laminating in the mortar in the form of twist-woven network, as in this invention, both of physical adhesion by lateral strands and chemical adhesion, namely the binding between reactive functional group in the reactive copolymer latex and calcium ion in the cement mortar matrix, result in strong bond between matrix and the network, that is equal to almost two linear FRP rods (impregnated strands), and the toughness also increases remarkably due to longitudinal pull of the lateral strands.

The above described laying of the network in the mortar can be done in an ordinary method.

For example, conventional laminating and laying method may be employed, or after setting the network in a mold, mortar can be poured and hardened.

At this time by removing bubbles with vibrator, etc., bond between mortar matrix and the fiber becomes stronger, and better mechanical properties can be obtained.

In this way, an ordinary section design method of reinforced concrete can be applied, and an efficient reinforcement utilizing less long fiber can be accomplished.

Moreover in this invention, at the time of laying long fiber in the mortar, short fiber may also be mixed with this mortar.

Figure 5:
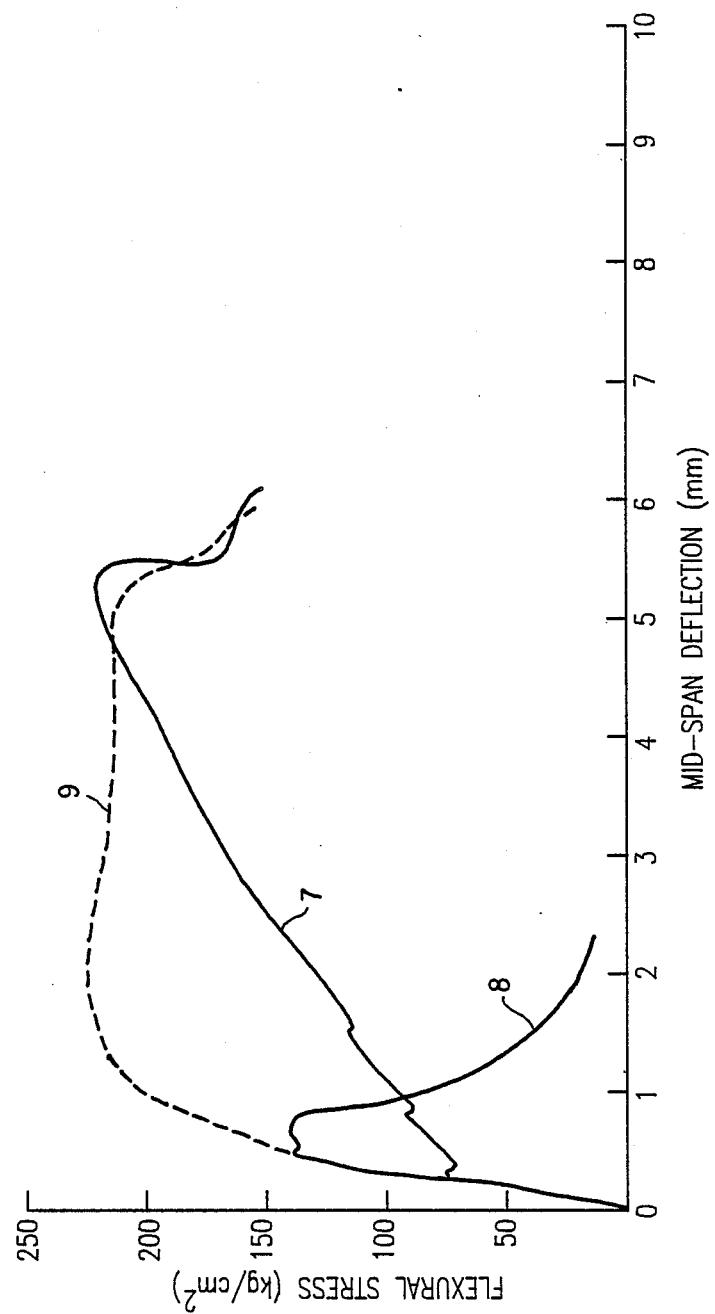

When mortar containing both network and short fiber is employed, a product can be obtained with a higher level of flexural stress in the full range of deflection than one which contains the network only, as shown in FIG. 5.

Any type of short fiber can be mixed with mortar. Carbon fiber, alkali-resistant glass fiber, aramid fiber or high-strength vinylon fiber are preferable.

These short fibers are normally 1~50 mm long, and mixing with mortar is done by a direct spray method or pre-mix method, etc.

Amount of fiber addition to mortar is selected between 0.2~10 volume parts of 100 volume parts of mortar.

In the present invention, the bond between the reinforcing material and the cement mortar matrix is improved, and a cement mortar product of higher strength and flexural strength can be obtained with less amount of fiber.

Also, this product is capable of undergoing autoclaving and, its dimensional stability is improved without losing bending strength of the product.

In addition to using the obtained product in contact with metal, or laying reinforcing metal, for exemple iron reinforcing rod etc., there is an advantage that carbon fiber in this product, being coated with resin, is insulated electricaly from metal, which prevents electrolytic corrosion of the metal.

In addition, section design can be selected easily and efficiently according to the use and loading condition.

EXAMPLE

Now, the present invention will be described in the further detail with reference to Examples. However, it should be understood that the present invention is by no means restricted by these specific examples.

EXAMPLE 1

A network(3.5 openings/inch), made of high strength carbon fiber("HTA-7-3000", without twist, made by TOHO BESLON), is impregnated with room temperature hardening type epoxy resin(made by DAINIPPON SHIKIZAI, main agent: "B-910R", hardening agent: "B-910H") diluted in the solvent (toluene:iso-propyl-alcohol=4:1(weight proportion)) and air-dried.

This network is about 95 g/m$^2$, and made of carbon fiber strands of has 6000 filaments in the direction of twist-woven strands, and 3000 filaments in the lateral direction.

This network is laid in the cement mortar, so that twist-woven strands direction corresponds to the longitudinal direction, and the bending specimens of W:40×T:20×L:320 mm are obtained.

Volume fraction of the fiber of the cross section is 0.17%, and the network is laid about 2~3 mm from the bottom of the mortar specimen.

Rapid-hardening Portland cement is employed as cement, TOYOURA STANDARD SAND as fine aggregate. Water/cement ratio is 0.55, and sand/cement ratio is 1.6.

Flexural strength of the specimen with 260 mm span is obtained by three points bending test, after 1 week of cure.

Number of specimen is 3. Flexural strength is 160.4 kg/cm$^2$ on the average. Deflection continues even after the maximum flexural stress, and it exceeds beyond 10 mm.

A couple of cracks occurred in each side from the center of the specimen.

EXAMPLE 2

The process of Example 1 was followed except that rapid-hardening Portland cement was added to No. 5 silica sand with sand/cement ratio of 0.66, a water/cement ratio of 0.32 was obtained of cement mortar, to which 1% volume fraction of carbon fiber (180 kg/mm$^2$ in flexural strength, 15 t/mm$^2$ in tensile modulus, and 15 um diameter of the fiber) was mixed in and cut to 1.8 cm by direct-spray method.

Bending test of the specimen is run in accordance with the process of example 1. The effects are shown in FIG. 5, as curve 9.

EXAMPLE 3

The process of Example 1, was followed except that after air-drying fibers are coated with self-bridging styrene-butadiene copolymer latex ("LX 415A", made by NIPPON ZEON), hardened (bridged) by heat-treatment of 150° C. for 15 min.

This network is about 95 g/m$^2$, and made of carbon fiber of 6000 filaments in the direction of twist-woven strands, and 3000 filaments in the lateral direction.

This network is laid in the cement mortar, in 2-3 mm from the bottom of mortar specimen, so that twist-woven fibers are oriented in the longitudinal direction, and the cross-sectional volume fraction of the fiber is 0.17%.

Rapid-hardening Portland cement is employed as cement, TOYOURA STANDARD STAND as fine aggregate, water/cement ratio is 0.55, and sand/cement ratio is 1.6.

The product was tested after autoclaving by two measures, (1): one week at room temperature, (2): autoclaving in 180° C. for 5 hr with vapor pressure of 10 kg/cm$^2$, results are in Table 1.

EXAMPLE 4

Product is obtained in accordance with example 3 except that the first treatment resin-impregnated with thermo-setting epoxy resin(main agent: "EP828", hardening agent: tri-f borobe monoethylamine, weight proportion 100:3) is diluted with solvent (methylethylketone, weight proportion 1:1), and heat-treated at 150° C. for 15 min. to harden the resin.

The result is shown in Table 1.

EXAMPLE 5

Product is obtained in accordance with example 3 that except a self-bridging metaphorising acrylic acid ester co-polymer latex ("LX855", made by NIPPON ZEON) is used. The result is shown in Table 1.

COMPARATIVE EXAMPLE

COMPARATIVE EXAMPLE 1

The mortar specimen is obtained in accordance with the process of example 1 except that the lateral fiber is oriented in the longitudinal direction of the specimen and twist-woven strands are oriented in the lateral direction. Cross-sectional volume fraction of the lateral fiber is 0.15% as in example 1.

The flexural strength was 186 kg/cm$^2$. At the maximum flexural stress, the fibers fail and the specimen breaks into two pieces, and fall from the supports. The maximum mid-span deflection was 4.5 mm, that is less than half of the above-described example.

COMPARATIVE EXAMPLE 2

In accordance with the process of example 2, but without twist-woven network, mortar specimen containing short fibers is obtained by direct-spray method, and bent as in example 2. The result is shown in FIG. 5, as curve 8.

For reference, the result of the bending test of the specimen obtained by the process in accordance with the example but without short fiber (same volume fraction as ex.2) is shown in FIG. 5, a curve 7.

COMPARATIVE EXAMPLE 3

The product is obtained in accordance with example 3 except using non-metaphorising styrene-butadiene co-polymer latex("Nipol 2507", made by NIPPON ZEON). The result is shown in Table 1.

COMPARATIVE EXAMPLE 4

The product is obtained in accordance with example 3 except using non-metaphorising acrylonitrile butadiene co-polymer latex("LX531", made by NIPPON ZEON), in the second treatment. The result of the test is shown in Table 1.

We claim:

1. A cement mortar product reinforced with a twist-woven, network of fibers, impregnated with synthetic resin, and further coated with a self-bridging reactive copolymer latex, wherein said network is placed in said cement mortar with said twist-woven fibers oriented in the direction of the maximum tensile strength.

2. The product according to claim 1, wherein said reinforcing fibers are carbon fibers, alkali-resistant glass fibers or aramid fibers.

3. The product according to claim 1, wherein the number of said openings of the network is not more than 10 openings/inch.

4. The product according to claim 1, wherein said resin for impregnation into the network is epoxy-resin, urethane resin, or phenol.

5. The product according to claim 1, wherein said cement mortar additionally contains short fibers.

TABLE 1

|  | Treatment of the twist-woven network | | properties of the product | | | |
|---|---|---|---|---|---|---|
|  |  |  | after 1 week cure at room temperature | | after autoclaving | |
|  | 1st treatment (resin) | 2nd treatment (latex) | flexural stress (kg/cm$^2$) | mid-span deflection (mm) | flexural stress (kg/cm$^2$) | mid-span deflection (mm) |
| Example 3 | room temp. hardening epoxy | self bridging SBR | 245 | 11.5 | 250 | 10.8 |
| 4 | thermo-setting epoxy | self bridging SBR | 231 | 10.2 | 224 | 9.3 |
| 5 | thermo-setting epoxy | self bridging acrylic acid ester | 244 | 9.7 | 239 | 9.5 |
| Comparative Example 3 | room temp. hardening epoxy | SBR | 206 | 10.5 | 164 | 6.5 |
| 4 | room temp. hardening epoxy | NBR | 198 | 10.9 | 147 | 6.3 |

UNITED STATES PATENT AND TRADEMARK OFFICE
CERTIFICATE OF CORRECTION

PATENT NO. : 4,910,076
DATED : Mar. 20, 1990
INVENTOR(S) : Tatsuo Ando, et al

It is certified that error appears in the above-identified patent and that said Letters Patent is hereby corrected as shown below:

Title page:

The sixth inventor's name has been omited, should read:

--Yuji Noguchi--

Signed and Sealed this

Ninth Day of July, 1991

Attest:

HARRY F. MANBECK, JR.

Attesting Officer

Commissioner of Patents and Trademarks